United States Patent [19]

Irie

[11] Patent Number: 5,820,885
[45] Date of Patent: Oct. 13, 1998

[54] TIRE VULCANIZING SYSTEM

[75] Inventor: Nobuhiko Irie, Nagasaki, Japan

[73] Assignee: Mitsubishi, Jukogyo Kabushiki Kaisha, Tokyo, Japan

[21] Appl. No.: 301,620

[22] Filed: Sep. 7, 1994

[30]     Foreign Application Priority Data

| Sep. 14, 1993 | [JP] | Japan | 5-228960 |
| Sep. 14, 1993 | [JP] | Japan | 5-228961 |
| Sep. 30, 1993 | [JP] | Japan | 5-244658 |

[51] Int. Cl.$^6$ .................................................. B29C 35/00
[52] U.S. Cl. ..................... 425/34.1; 425/28.1; 425/38; 425/47; 425/48
[58] Field of Search ................. 425/34.1, 28.1, 425/38, 47, 48

[56]          References Cited

U.S. PATENT DOCUMENTS

| 1,900,456 | 3/1933 | Mead | 425/47 |
| 3,137,032 | 6/1964 | MacMillan | 18/2 |
| 3,550,196 | 12/1970 | Gazuit | 18/4 |
| 3,918,861 | 11/1975 | Klose | 425/34.1 |
| 3,932,079 | 1/1976 | Legostaev et al. | 425/32 |
| 3,988,077 | 10/1976 | Naratov et al. | 425/33 |
| 4,585,405 | 4/1986 | Capecchi | 425/38 |
| 4,744,739 | 5/1988 | Singh | 425/38 |
| 5,271,727 | 12/1993 | Irie | 425/36 |
| 5,622,669 | 4/1997 | Dailleiz et al. | 425/38 |

FOREIGN PATENT DOCUMENTS

| 4531384 | 10/1970 | Japan . |
| 46-24774 | 7/1971 | Japan . |
| 46-32497 | 9/1971 | Japan . |
| 49-130471 | 12/1974 | Japan . |
| 52-25879 | 2/1977 | Japan . |
| 52-44795 | 10/1977 | Japan . |
| 5775841 | 10/1980 | Japan . |
| 5-200754 | 8/1993 | Japan . |
| 802014 | 9/1958 | United Kingdom . |

*Primary Examiner*—David W. Wu
*Attorney, Agent, or Firm*—Birch, Stewart, Kolasch & Birch, LLP

[57]            ABSTRACT

A tire vulcanizing system includes a vulcanizing station in which a plurality of sets of tire molds for vulcanization are arranged; a mold opening/closing station having a mold opening/closing device for opening/closing the tire mold, a loader for inserting an unvulcanized tire into the tire mold, and an unloader for removing a vulcanized tire from the tire mold; and a transferring device for transferring a tire mold between the vulcanizing station and the mold opening/closing station.

17 Claims, 13 Drawing Sheets

TIRE VULCANIZING SYSTEM

FIELD OF THE INVENTION AND RELATED ART STATEMENT

The present invention relates to a system for vulcanizing pneumatic tires mounted on motor vehicles etc.

A fully automatic tire vulcanizing press which automatically performs a series of steps such as loading of unvulcanized tires, shaping, vulcanization of tires, and unloading of vulcanized tires has been publicly known.

On the aforementioned conventional fully automatic tire vulcanizing press, the time taken for loading of a tire, shaping, and unloading of the tire is shorter than the time taken for a vulcanization reaction to introduce a high-temperature, high-pressure heating/pressurizing medium into the inside of a tire mold with the tire mold being closed to vulcanize the tire. This provides waiting time of a mold opening/closing device (a device for opening/closing a tire mold in order to load/unload a tire) and a tire loading/unloading device, so that the mold opening/closing device and the tire loading/unloading device have a low rate of operation.

To improve the rate of operation, a fully automatic tire vulcanizing press of a mold opening/closing device has been proposed in which the mold opening/closing device is run over a plurality of tire molds. In this case, however, a tire mold clamping mechanism is required because the tire mold must be clamped from the outside to keep the tire mold closed against the pressure of the high-temperature, high-pressure heating/pressurizing medium in the tire, which makes the system expensive.

Also, this vulcanizing press of a mold opening/closing device has a problem in that waiting time of the mold opening/closing device takes place and there is a risk of danger in the case where a tire mold is changed because of specification changes of the vulcanized tire or in other cases.

The applicant of the present invention has already proposed a technique in which the force to open the mold is offset, within the mold, by the aforementioned heating/pressurizing medium (steam, steam plus inert gas, or warm water) during the vulcanization of tire, so that the mold need not be clamped from the outside of the mold (see Japanese Patent Laid-Open No. 5-200754).

With the use of this tire mold, the need for the aforementioned tire mold clamping mechanism is eliminated.

OBJECT AND SUMMARY OF THE INVENTION

The present invention has been made to solve the above problems. Accordingly, a first object of the present invention is to provide a tire vulcanizing system which can improve the rate of operation significantly and decrease the installation space per tire vulcanizing machine.

A second object of the present invention is to provide a tire vulcanizing system which can improve the rate of operation and the productivity, increase the number of tire molds being handled, and decrease the installation space.

A third object of the present invention is to provide a tire vulcanizing system which can improve the rate of operation of the mold opening/closing device etc. significantly, upgrade the tire quality greatly, and flexibly accommodate the sequence change of unvulcanized tire handling.

To achieve the first object, the tire vulcanizing system of the present invention includes a vulcanizing station in which a plurality of sets of tire molds for vulcanization are arranged; a mold opening/closing station having a mold opening/closing device for opening/closing the tire mold, a loader for inserting an unvulcanized tire into the tire mold, and an unloader for removing a vulcanized tire from the tire mold; and transferring means for transferring a tire mold between the vulcanizing station and the mold opening/closing station.

Also, the tire vulcanizing system of the present invention includes a vulcanizing station for vulcanizing tires by arranging a plurality of sets of tire molds; a mold opening/closing station for removing a vulcanized tire by opening the tire mold and for closing the tire mold after an unvulcanized tire is inserted; a first mold carrier for transferring a tire mold between the vulcanizing station and the mold opening/closing station; and a second mold carrier for transferring a tire mold between a tire mold delivery position and a tire mold opening/closing position in the mold opening/closing station.

Further, the tire vulcanizing system of the present invention includes a vulcanizing station for vulcanizing tires by arranging a plurality of sets of tire molds; a mold opening/closing station for removing a vulcanized tire by opening the tire mold and for closing the tire mold after an unvulcanized tire is inserted; a first mold carrier for transferring a tire mold between the vulcanizing station and the mold station; a second mold carrier for transferring a tire mold between a tire mold delivery position and a tire mold opening/closing position in the mold opening/closing station; and a mold changing station for changing a tire mold and a bladder, wherein the tire mold is transferred between these stations by using the first mold carrier.

The tire vulcanizing system of the present invention, which is configured as described above, performs the following functions:

First, a vulcanized tire is transferred from the vulcanizing station in which a plurality of tire molds are arranged to the mold delivery position in the mold opening/closing station by using the first mold carrier. At the mold opening/closing station, the tire mold is transferred to the mold opening/closing position by using the second mold carrier. Being connected to the mold opening/closing device, the tire mold is opened to remove the vulcanized tire by using an unloader attached to the mold opening/closing device.

An unvulcanized tire to be vulcanized next is inserted into the tire mold from which the vulcanized tire has been removed, by using an attached loader. The shaping of tire is performed during the tire mold closing process. After the tire mold is closed, a heating/pressurizing medium is introduced in the tire, and the tire vulcanization process is started.

The tire mold in which the vulcanization has been started is released from the mold opening/closing device, and returned by reversing the above procedure.

Second, when the change of a tire mold or bladder is needed due to the change of specifications of the vulcanized tire, after the vulcanized tire is unloaded by the above procedure, the tire mold is closed without loading an unvulcanized tire, and is transferred to the mold changing station.

If the tire changing station has mold opening/closing means, the bladder etc. is changed at the mold changing station. If the tire changing station has no mold opening/closing means, the bladder etc. is transported to another place by using another means to change the bladder etc. During this time, at the mold opening/closing station, the loading and unloading of a tire to and from another tire mold are performed. After the change of the bladder etc. has been completed, the mold is transferred to the mold opening/closing station to load an unvulcanized tire to be vulcanized next, and is transferred to the vulcanizing station.

Further, to achieve the second object of the present invention, the tire vulcanizing system of the present invention includes a vulcanizing station for vulcanizing tires by arranging a plurality of sets of tire molds; a mold opening/closing station for removing a vulcanized tire by opening the tire mold and for closing the tire mold after an unvulcanized tire is inserted and shaped; and a mold carriage for transporting a tire mold between the vulcanizing station and the mold opening/closing station. Also, the tire vulcanizing system of the present invention includes a vulcanizing station for vulcanizing tires by arranging a plurality of sets of tire molds; a mold opening/closing station for removing a vulcanized tire by opening the tire mold and for closing the tire mold after an unvulcanized tire is inserted and shaped; a mold changing station for changing a tire mold and a bladder; and a mold carriage for transporting a tire mold between these stations.

Further, the tire vulcanizing system of the present invention is characterized in that the mold carriage is configured so as to carry two tire molds.

Still further, the tire vulcanizing system of the present invention is characterized in that the vulcanizing station can arrange tire molds at least two stages in the vertical direction during vulcanization.

The tire vulcanizing system of the present invention, which is configured as described above, performs the following functions:

First, a vulcanized tire is received from the vulcanizing station, in which a plurality of tire molds are arranged, by using the mold carriage and transported to the mold opening/closing station. After the tire mold transported to the mold opening/closing station is connected to the mold opening/closing device, the mold is opened by the action of the mold opening/closing device. The vulcanized tire is removed by using the unloader attached to the mold opening/closing device. An unvulcanized tire to be vulcanized next is inserted into the tire mold from which the vulcanized tire has been removed, by using an attached loader. The shaping of the tire is performed during the tire mold closing process. After the tire mold is closed, a heating/pressurizing medium is introduced and sealed in the tire, and the tire vulcanization process is started. The connection between the tire mold in which the vulcanization has been started and the mold opening/closing device is severed, and the mold is again put on the mold carriage so that the mold is transported and returned to the vulcanizing station.

Second, when the change of a tire mold or bladder is needed due to the change of specifications of a vulcanized tire, after the vulcanized tire is unloaded by the above procedure, the tire mold is closed without loading an unvulcanized tire, and is transferred to the mold changing station. If the tire changing station has a mold opening/closing device (not including a heating/pressurizing medium introducing system), the bladder etc. is changed at the mold changing station. If the tire changing station does not have a mold opening/closing device, the bladder etc. is transported to another place by using another means to change the bladder etc. During this time, at the mold opening/closing station, the loading and unloading of a tire to and from another tire mold are performed. After the change of the bladder etc. has been completed, the mold is transferred to the mold opening/closing station to load an unvulcanized tire to be vulcanized next, and is transferred to the vulcanizing station.

Third, the above description has been presented for the case where the mold carriage can carry one tire mold. In this case, during the time when the loading and unloading of a tire to and from the tire mold are performed, the mold carriage must wait in front of the mold opening/closing station, so that the operation of the mold opening/closing station and the carriage is restricted. If the mold carriage can carry two tire molds, however, this restriction is relaxed, thereby allowing efficient operation. The Nth tire mold in which vulcanization is completed is loaded at one loading position, and the carriage is moved so that the empty loading position comes to the front of the mold opening/closing station. The carriage receives the (N−1)th tire mold from which the tire is unloaded. Then, the carriage is moved again so that the Nth tire mold of a vulcanized tire, which has been carried previously, comes to the front of the mold opening/closing station. After the Nth tire mold of a vulcanized tire is supplied to the mold opening/closing station, the loaded (N−1)th tire mold is transferred to the vulcanizing station. During the time when the loading and unloading of a tire are performed at the mold opening/closing station, a tire mold to which a tire is loaded can be transported to the vulcanizing station, and the tire mold having the vulcanized tire can be transported from the vulcanizing station. Therefore, the mold opening/closing station can be used more effectively. Fourth, the vulcanizing station is configured so that the tire molds are arranged in at least two stages in the vertical direction during vulcanization, and the vulcanizing station is arranged at one side of the passage of the mold carrier. Therefore, the space occupied by the system can be decreased.

To achieve the third object of the present invention, the tire vulcanizing system of the present invention includes a plurality of sets of tire molds; a mold opening/closing device running on rails arranged in parallel with the tire molds; an unloader, running on the rails, for unloading a vulcanized tire from an opened tire mold; and a loader, running on the rails, for loading an unvulcanized tire into the tire mold.

Further, the tire vulcanizing system of the present invention further includes an unvulcanized tire supply device including: storing racks for storing a plurality of sets of pallets and an unvulcanized tire thereon; and a conveying device for transferring the unvulcanized tire selected from the storing racks to a delivery position together with the pallet, delivering the unvulcanized tire to the loader at the delivery position to transfer the empty pallet to an unvulcanized tire receiving position, and transferring the pallet carrying an unvulcanized tire at the tire receiving position to an empty position on the storing racks.

The tire vulcanizing system of the present invention, which is configured as described above, performs the following functions:

First, the mold opening/closing device, the empty unloader, and the loader gripping an unvulcanized tire are gathered at the position of the tire mold during vulcanization. After the vulcanization is completed, the tire mold is opened by the mold opening/closing device. The vulcanized tire is hung up by the unloader, and is transferred to a post-processing device such as a vulcanized tire gripping/expanding/cooling device. After the vulcanized tire is unloaded, an unvulcanized tire is loaded into the tire mold by using the loader. Then, the loader is moved to the unvulcanized tire supply device to fetch an unvulcanized tire. The tire mold is closed by the mold opening/closing device, and the mold opening/closing device is moved to the tire mold position where vulcanization is completed next.

Second, at the unvulcanized tire supply device, a tire to be vulcanized next is selected from the storing racks, and transferred to the delivery position together with a pallet. While the unvulcanized tire is loaded by the loader, the empty pallet is transferred from the delivery position to the unvulcanized tire receiving position, and waits there. The unvulcanized tire, which is transported by a monorail hoist etc., is put on the waiting pallet, and then transferred to an empty position on the storing racks together with the pallet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

One embodiment of a tire vulcanizing system of the present invention will be described below with reference to FIGS. 1 to 9.

Figure 1:
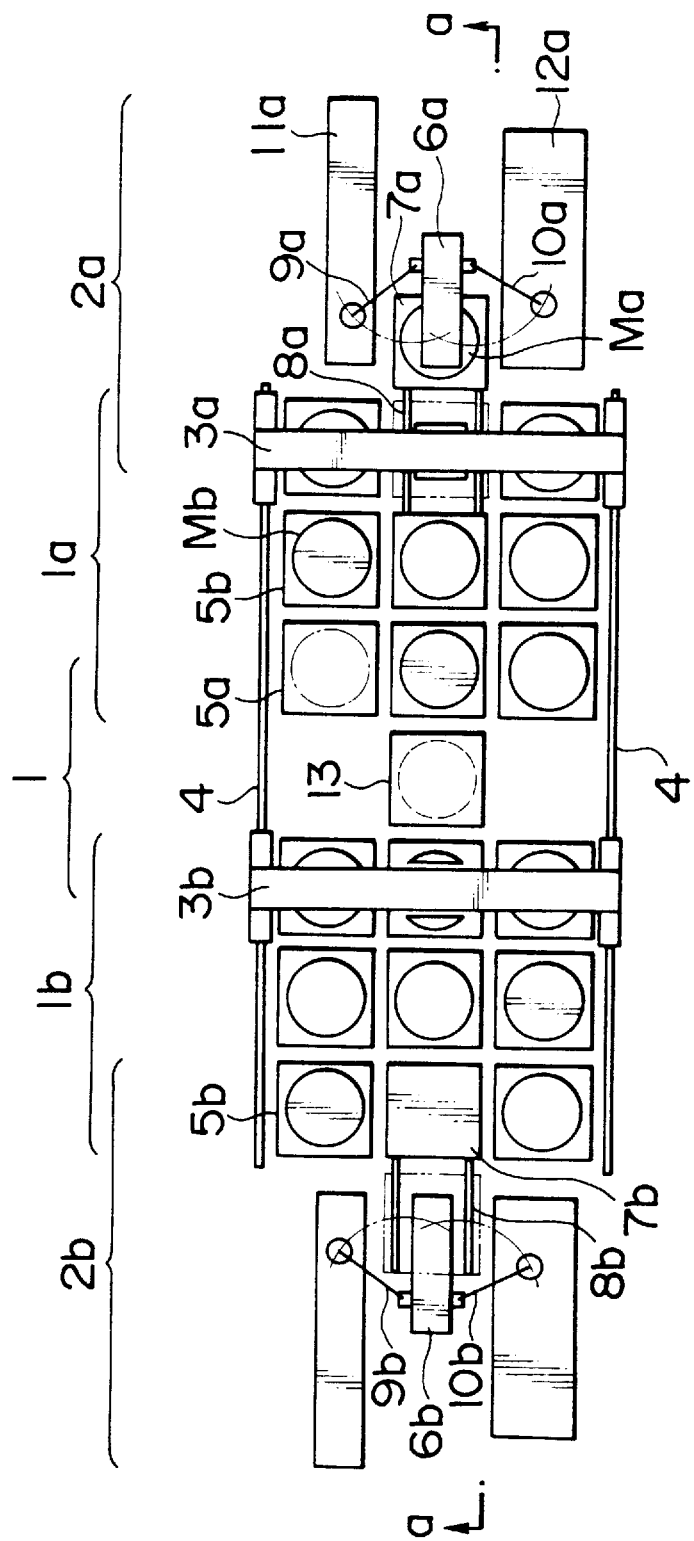
FIG. 1 is a plan view of a first embodiment of the tire vulcanizing system in accordance with the present invention.
Figure 2:
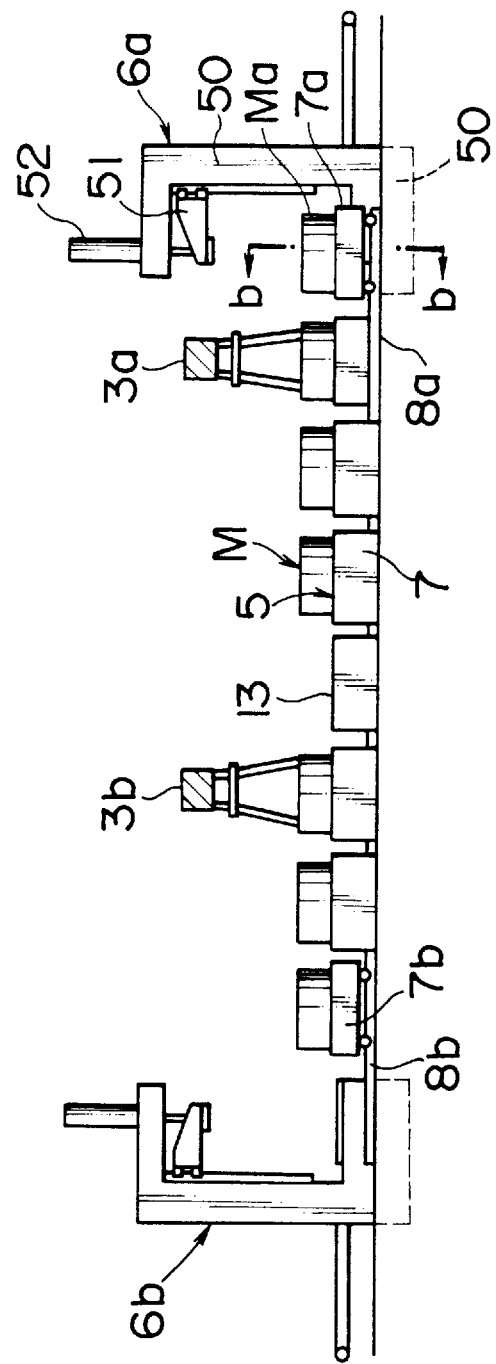
FIG. 2 is a side view taken along the line a—a of FIG. 1.

FIG. 1 is a plan view of one embodiment of the tire vulcanizing system in accordance with the present invention, and FIG. 2 is a side view taken along the line a—a of FIG. 1.

First, the entire configuration of the tire vulcanizing system will be described with reference to FIGS. 1 and 2.

A vulcanizing station 1 consists of two stations 1a and 1b arranged at right and left. Needless to say, the vulcanizing station may consist of one or three or more stations. Each station includes a plurality of mold bases 5 (5a, 5b, . . . ) on which tire molds M (Ma, Mb, . . . ), which will be described in detailed later, are mounted. Each mold base 5 is provided with heating/pressurizing medium replenishing means and pipes etc. as necessary.

A first mold carrier is formed by rails 4 fixed to the floor and portal type transporting devices 3a and 3b, which run by being guided by the rails 4 and have gripping means, elevating means, and transversing means of the tire mold M each. The mold carrier may be of an overhead traveling type depending on the construction of the factory building.

A mold opening/closing station 2a, 2b includes a mold opening/closing device 6a, 6b, which is similar to that of the publicly known tire vulcanizing machine (the difference will be described later); a second mold carrier consisting of a table 7a, 7b which runs by being guided by rails 8a and 8b fixed to the floor; a publicly known unloader 9a, 9b for removing a vulcanized tire from the tire mold M; and a publicly known loader 10a, 10b for inserting an unvulcanized tire into the tire mold M. If necessary, a conveyor 11a for conveying vulcanized tires, a rack 12a for unvulcanized tires, etc. may be installed additionally.

A mold changing station 13 is a mold changing table for changing tread mold, sidewall mold, etc. in the tire mold due to changes in the specifications of a vulcanized tire and for changing a bladder, which is an expendable item, etc. It is provided with a mold opening/closing means (not shown), which is necessary for the changing work. If necessary, a mold preheating chamber may be attached. Alternatively, the mold changing table may be used simply as a table for temporarily storing the tire mold M or as a tire mold preheating chamber, and the change of parts may be performed at other places after the tire mold M is transported with a forklift etc.

Figure 3:
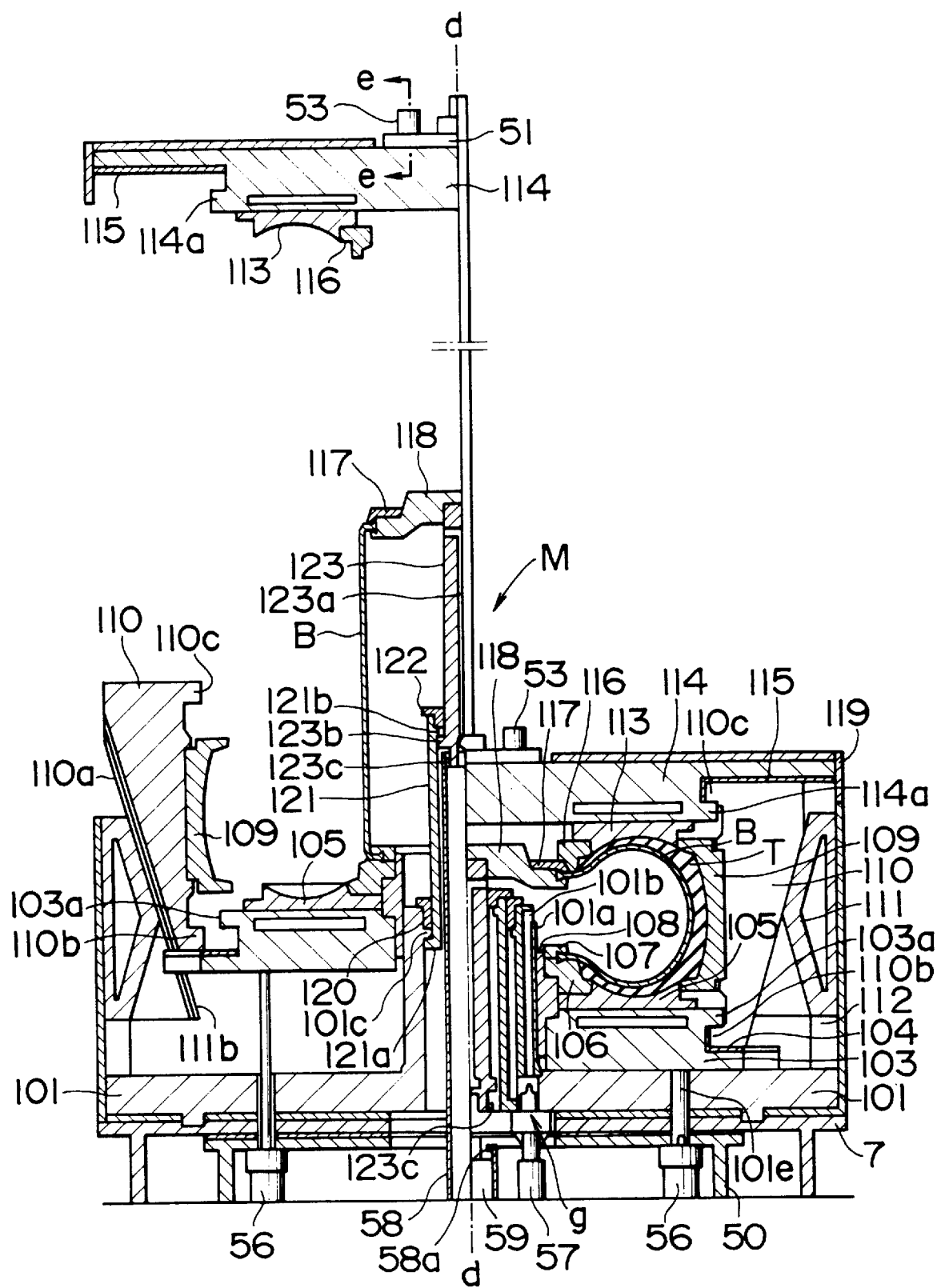
FIG. 3 is an enlarged sectional view taken along the line b—b of FIG. 2.

Next, the details of the mold M will be described with reference to FIGS. 3 to 9. The left side from the line d—d of FIG. 3 shows the condition in which the tire mold M is opened and the vulcanized tire is unloaded, while the right side shows the condition in which an unvulcanized tire T is loaded, the tire mold is closed, and vulcanization is started by introducing a heating/pressurizing medium into the tire T via a bladder B.

The base plate 101 for the tire mold M is fixed to the table 7 by means of a publicly known locking device (not shown). A lower hot platen 103 is fixed to a bush 108, which is inserted slidably in the vertical direction with the outer peripheral surface of a cylinder 101a formed at the center of the base plate 101 being a guide. The lower hot platen 103 is moved up and down by a rod of a cylinder 56 fixed to a frame 50 which moves vertically through a hole 101e formed in the base plate 101.

Reference numeral 105 denotes a lower sidewall mold bolted to the lower hot platen 103, and 106 denotes a lower bead ring assembled to the bush 108 by means of a publicly known bayonet locking mechanism. The lower end of the bladder B is held between a bladder holder 107 bolted to the lower bead ring 106 and the lower bead ring 106.

Reference numeral 109 denotes a tread mold divided into plural numbers in the peripheral direction, which is bolted to the inner peripheral surface of a plurality of segments 110 whose outer peripheral surface practically forms a conical surface when the mold is closed. An outer ring 111, which has a conical surface engaging with the outer peripheral surface of the segment 110 on the circumference, is bolted to the base plate 101 via a spacer 112.

A T-shaped groove 110a, is formed in the up-and-down direction in the outer peripheral conical surface of the segment 110, and a T bar 111b, which is slidable while engaging with the T-shaped groove 110a, is fixed to the inner peripheral conical surface of the outer ring 111.

When the lower hot platen 103 is raised by the operation of the cylinder 56, the segment 110 is pushed up via a pressure receiving plate 104 fixed to the lower hot platen 103, and the segment 110 slides outward in the radial direction by being guided by the T bar 111b, so that the tread molds 109 relatively separate in the radial direction with respect to the lower sidewall mold 105. With this movement, a claw 110b formed at the lower part of the segment 110 relatively moves outward in the radial direction with respect to a claw 103a formed at the outer periphery of the lower hot platen 103, which has engaged with the claw 110b, releasing from engagement.

An upper hot platen 114 to which a pressure receiving plate 115 is fixed rides on the segment 110 via the pressure receiving plate 115 when the tire mold M is closed. A claw 114a formed on the upper hot platen 114 engages with a claw 110c formed at the upper part of the segment 110. When the segment 110 slides in the radial direction as described above, these claws engage with each other or disengage from each other.

Reference numeral 113 denotes an upper sidewall mold bolted to the upper hot platen 114, and 116 denotes an upper bead ring bolted to the upper sidewall mold 113.

To an arm 51, which is assembled to the frame 50 in such a manner as to be freely movable vertically, is fixed the rod end of a cylinder 52 fixed to the frame 50. The arm 51 is moved up and down by the operation of the cylinder 52.

Figure 4:
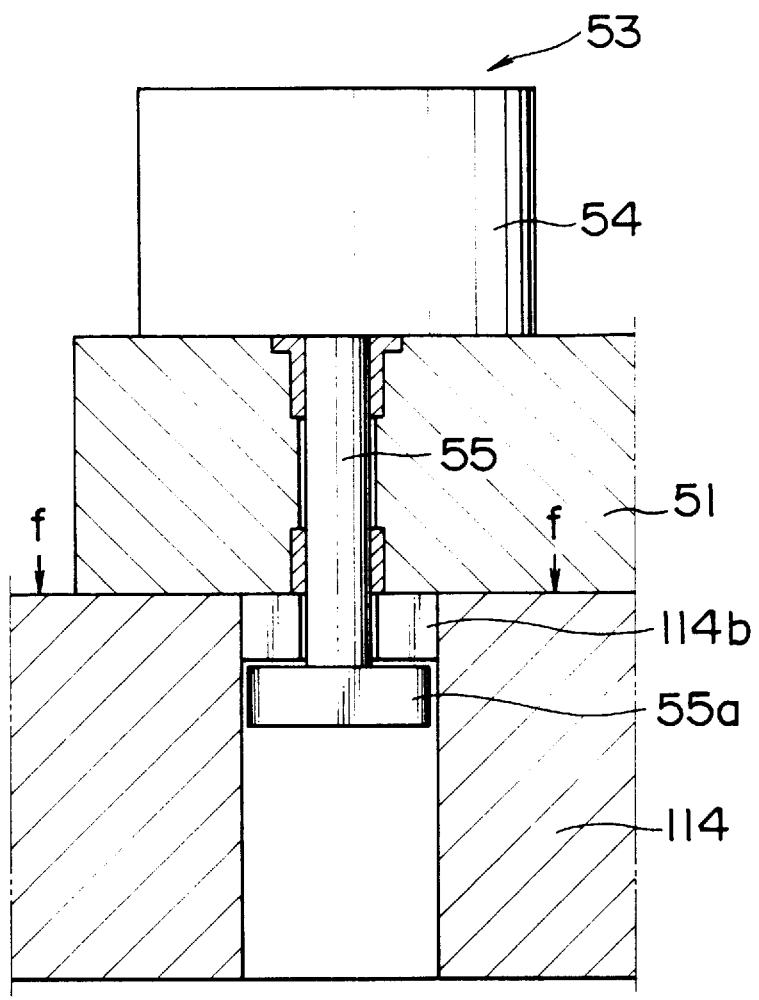
FIG. 4 is a longitudinal sectional view taken along the line e—e of FIG. 3.
Figure 5:
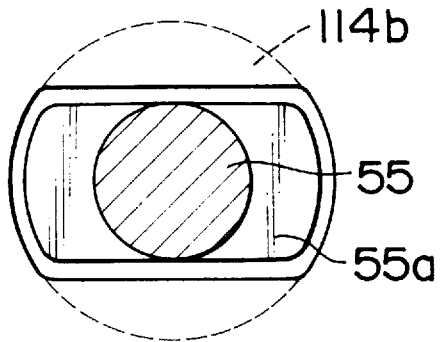
FIG. 5 is a plan view showing one example of an upper hot platen attaching/detaching means, taken along the line f—f of FIG. 4.
Figure 6:
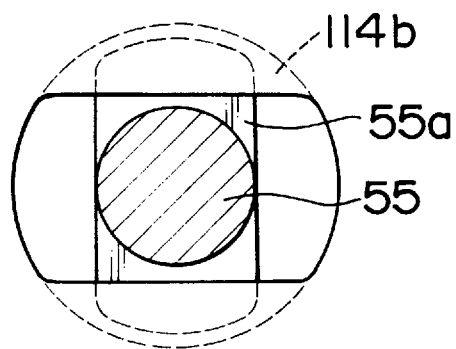
FIG. 6 is a plan view showing another example of an upper hot platen attaching/detaching means, taken along the line f—f of FIG. 4.

The means 53 for attaching and detaching the upper hot platen to and from the arm 51 is as follows: As shown in FIGS. 4 to 6, a rotary cylinder 54 is assembled to one end of a T rod 55, the other end of which is integrally formed into a T-shaped claw 55a, so that the claw 55a can engage with a claw 114b integrally attached to the upper hot platen 114 or can pass through by rotating the T rod 55 ninety degrees by the operation of the rotary cylinder 54.

During the time when the attaching/detaching means 53 connects the arm 51 with the upper hot platen 114, and the segment 110 moves outward in the radial direction to disengage the claw 110c from the claw 114a, the operation of the cylinder 52 raises the upper sidewall mold 113 and the upper bead ring 116 together with the upper hot platen 114.

A second center post 121 is inserted into the upper end of a cylindrical portion 101a of the base plate 101 in such a manner as to be freely slidable vertically with the inner peripheral surface of a bolted bush 120 as a guide. Into the upper end of the second center post 121 is inserted a first center post 123 in such a manner as to be freely slidable vertically with the inner peripheral surface of a bolted bush 122 as a guide. Thus, the first center post 123 moves up and down via an extension rod 59 connected to the rod end of a cylinder for moving the center post up and down (not shown) fixed to the frame 50 and via the engagement of a claw 58a assembled to the upper end of the extension cylinder 58 with a claw 123c formed at the lower end of the first center post 123.

When the first center post 123 rises, so that a flange 123b formed at the lower part of the first center post 123 abuts on a ring-shaped protrusion 121b formed on the inside of the second center post 121 near its upper end, the second center post 121 rises, so that a flange 121a formed at the lower end of the second center post 121 abuts on a ring-shaped protrusion 101c formed on the inside of the cylindrical portion 101a near its upper end. As a result, the first and second center posts 121 and 123 stop rising.

When the posts are lowered, the outer peripheral end of the bush 122 abuts on the bush 120 to stop lowering of the second center post 121, and a flange 118 bolted to the upper end of the first center post 123 abuts on the bush 122 to stop lowering of the first center post 123.

The upper end portion of the bladder B is held by the bladder holder 117 bolted to the flange 118, so that the upper and lower ends of the bladder B separate from each other or approach to each other by the up-and-down motion of the center post.

Figure 7:
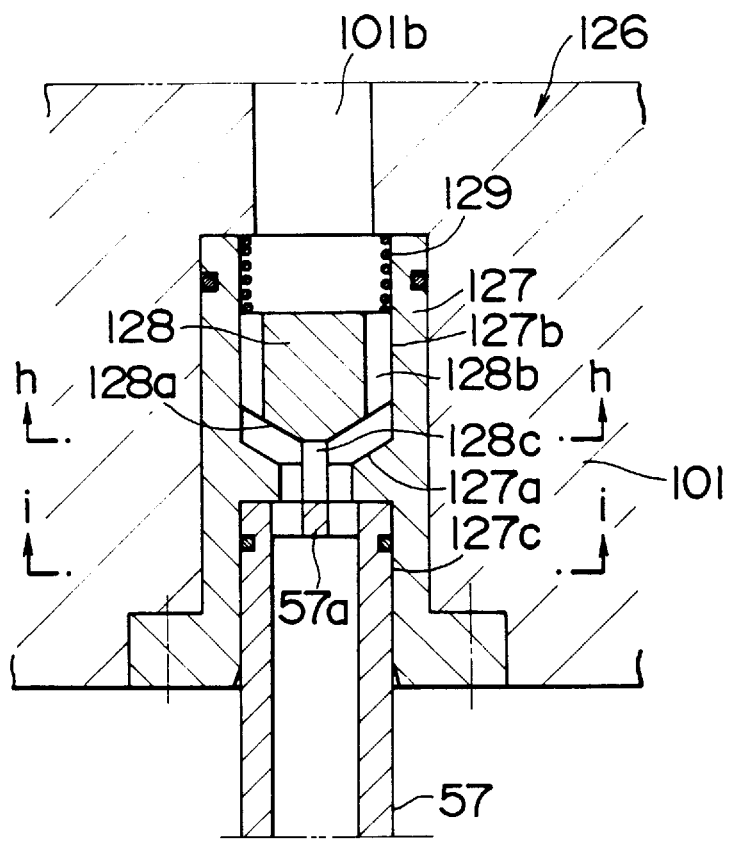
FIG. 7 is an enlarged sectional view of the portion indicated by the arrow g of FIG. 3.
Figure 8:
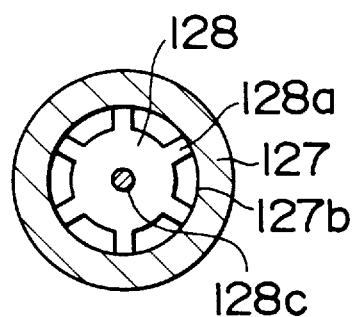
FIG. 8 is a transverse sectional view taken along the line h—h of FIG. 7.
Figure 9:
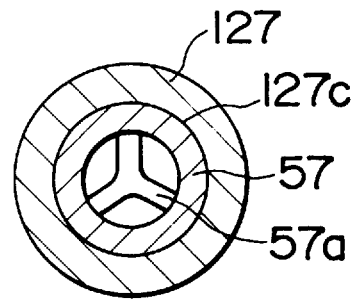
FIG. 9 is a transverse sectional view taken along the line i—i of FIG. 7.

The cylindrical portion 101a of the base plate is provided with a passage 101b for supplying and discharging a heating/pressurizing medium to and from the inside of the tire T via the bladder B. The lower end of the passage 101b can be attached to and detached from a pipe 57 of the mold opening/closing device 6a or 6b via publicly known attaching/detaching means 126. The portion indicated by g in FIG. 3 is enlarged and shown in FIGS. 7 to 9. As shown in FIGS. 7 to 9, attaching/detaching means 126 includes a valve body 127 which is embedded in and fixed to the base plate 101 and a valve element 128 which slides with one inner peripheral surface 127b of the valve body 127 as a guide. The valve element 128 has a seat surface 128a which engages with a valve seat 127a formed at the intermediate portion of the valve body 127. The valve element 128 is urged against the valve seat 127a by a coil spring 129. The valve seat 127a communicates with the pipe 57, and the pipe 57 is raised and lowered by raising/lowering means (not shown) assembled to the frame 50, and has a cylindrical surface slidably engaging with the other inner peripheral surface 127c of the valve body 127 at the outer periphery of the tip end. 128b is a passage.

At the tip end of the pipe 57, a Y-shaped member 57a is formed, which member is in contact with a valve stem extending on the side of the seat surface 127a of the valve element 128, so that when the pipe 57 is inserted into the valve body 127, the valve element 128 is raised, the passage 101b being connected to the pipe 57, and when the pipe 57 is pulled down, the valve element 128 is pushed down by the coil spring 129, the passage 101b being closed. A switching valve (not shown) etc. is installed between the pipe 57 and a source of heating/pressurizing medium.

The first center post 123 also has a passage 123a for introducing steam for shaping, etc. into the tire T via the bladder B, and similar attaching/detaching means is also installed under the passage 123a.

As seen from the above description, the mold opening/closing device 6a, 6b is configured in substantially the same manner as the conventional tire vulcanizing machine except that the device has no pressurizing means for clamping the tire mold to prevent the tire mold from opening against the force to open the tire mold by the pressure of the heating/pressurizing medium and that the device has the attaching/detaching means as compared with the conventional tire vulcanizing machine.

Next, the operation of the tire vulcanizing system shown in FIGS. 1 and 2 will be described.

FIGS. 1 and 2 show the condition in which vulcanization of a tire in the tire mold Ma mounted on the mold base 5a of the vulcanizing station 1a has been completed, and the tire mold Ma has been transported to the mold opening/closing position in the mold opening/closing device 6a of the mold opening/closing station 2a by using the mold transporting device 3a, 7a.

From this condition, the cylinder 52 is first operated to lower the arm 51, and then the upper hot platen 114 of the tire mold Ma is connected to the arm 51 by using the attaching/detaching means. At the same time, the pipe 57 is raised so as to communicate with the passage 101b. Then, the extension rod 59 is raised slightly so that the pipe 57 also communicates with the passage 123a. The cylinder 58 is rotated so that the claw 58a engages with the claw 123c.

Next, the switching valve (not shown) is operated to discharge the heating/pressurizing medium in the tire T. After a check is made to see that the pressure in the tire T is sufficiently decreased, the cylinder 56 is operated to push up the lower hot platen 103 so that the tread mold 109 is relatively moved from the tire T to release the mold.

The diameter of the tread mold 109 is increased sufficiently, and the claws 10b and 110c of the segment 110 are disengaged from the claws 103a and 114a of the upper and lower hot platens. After that, the upper hot platen 114 is raised by the operation of the cylinder 52 in order to release the upper sidewall mold 113. The center post 123 is raised while a vacuum is created in the bladder B via the passage 123a in order to pull out the bladder B from the inside of the tire T.

Then, the vulcanized tire T is removed out of the tire mold Ma by the use of the publicly known unloader 9a, and the unvulcanized tire T to be vulcanized next is inserted into the tire mold Ma by the use of the publicly known loader 10a. While supplying steam for shaping into the bladder B via the passage 123a, the center post 123 is lowered, and the bladder B is inserted into the loaded unvulcanized tire T. After releasing the grip of tire T, the loader 10a, is moved to the waiting position.

When the loader 10a moves to a position such that the loader 10a does not interfere with the upper hot platen 114, the upper hot platen 114 is lowered by the operation of the cylinder 52 to perform the shaping and tire mold closing processes by the publicly known procedure. After the upper hot platen 114 is allowed to abut on the segment 110, the cylinder 56 is also operated to push down the lower hot platen 103 by the upper hot platen 114 through the segment 110. This push-down action decreases the diameter of the tread mold 109, closing the tire mold Ma.

At this time, the claw 110c engages with the claw 114a, and the claw 103a engages with the claw 110b at the same time. Therefore, even when a heating/pressurizing medium is introduced to the inside of the tire T via the bladder B after the tire mold Ma is closed and vulcanization is started, the force to open the mold by the pressure of the heating/pressurizing medium is offset by the engagement of the claw 110c with the claw 114a and the engagement of the claw 103a with the claw 10b, so that the mold is not opened.

From this condition, the vulcanization of the tire is started. Then, the connection between the tire mold Ma and the mold opening/closing device 6a is severed by reversing the above procedure. At this time, the passages 123a and 101b maintain the tire internal pressure because a check valve is installed at the lower part of each of the passages.

Then, the table 7a of the mold transporting device is moved to the position indicated by the two-dot chain line by using the rails 8a. Thus, the tire mold Ma is transferred from the opening/closing position to a transfer position, and moved to a predetermined position on the mold base 5a by using the portal type transporting device 3a of the first mold carrier.

After the vulcanization of the tire in the tire mold Mb is completed, the tire mold Mb is transferred from the mold base 5b to the mold opening/closing position in the mold opening/closing station 2a by reversing the above procedure.

When the bladder B etc. is changed, the mold is closed once without loading the tire T to be vulcanized next (in this case, needless to say, a heating/pressurizing medium is not introduced). The mold is transferred to the mold changing station 13 to change the bladder B etc. During that time, loading and unloading of tire to and from another tire mold M are performed at the mold opening/closing position 6a, 6b. After the change of the bladder B etc. is completed, the mold is transferred again to the mold opening/closing device 6a or 6b to load the tire T to be vulcanized next.

The tire vulcanizing system of the present invention, which is configured as described above, performs the following functions:

First, a tire mold of a type which offsets the force to open the tire mold by the pressure of the heating/pressurizing medium in the tire mold is used, and the tire mold is transported to the vulcanizing station during vulcanizing of a tire because the tire mold can be attached to and detached from the mold opening/closing device, by which the rate of operation of the tire mold opening/closing and the tire loading/unloading device, which had a very low rate of operation, can be significantly increased.

Second, the addition of the mold changing station allows the change of a bladder, etc., safely and without disturbing the process of other tire molds. Therefore, the rate of operation of the whole system can be improved.

Third, as seen from the embodiment, the vulcanizing stations etc. are arranged to the right and left of the mold changing station, by which the rate of operation of the mold changing station can be improved, and the installation space per tire mold can be decreased.

Next, the entire configuration of a tire vulcanizing system of a second embodiment will be described with reference to FIGS. 10 and 11.

A vulcanizing station 1 includes, for example, 1a and 1b. Needless to say, the vulcanizing station may include one or more stations. Although the vulcanizing station will be described in detail later, it includes a plurality of mold bases 5 (5a, 5b, 5c, . . . ) on which a plurality of tire molds M (Ma, Mb, Mc, . . . ) are mounted. Each of the mold bases 5 is provided with mold moving means (for example, a cylinder-driven pusher) (not shown), and with heating/pressurizing medium replenishing means and pipes etc. as necessary.

A mold opening/closing station 2 (2a and 2b) includes a mold opening/closing device 6 (6a and 6b), which is similar to that of the publicly known tire vulcanizing machine (the difference will be described later); a publicly known unloader 7a for unloading a vulcanized tire from the tire mold; and a publicly known loader 8a for loading an unvulcanized tire into the tire mold, and is provided with a conveyor 9a, for conveying vulcanized tires, and a rack 10a, for storing unvulcanized tires, etc., if necessary.

A mold carriage is formed by rails 4 fixed to the floor, and publicly known carriages 3 (3a and 3b) which are guided by the rails 4 run by the operation of a driving means (not shown).

A mold changing station 11 is a mold changing table for changing tread mold, sidewall mold, etc. in the tire mold due to the change of specification of vulcanized tire and for changing a bladder, which is an expendable item, etc. It is provided with a mold opening/closing means, which is necessary for the changing work. If necessary, a mold preheating chamber may be attached. Alternatively, the mold changing table may be used simply as a table for temporarily storing the tire mold or as a tire mold preheating chamber, and the change of parts may be performed at other places after the tire mold is transported with a forklift etc.

Figure 11:
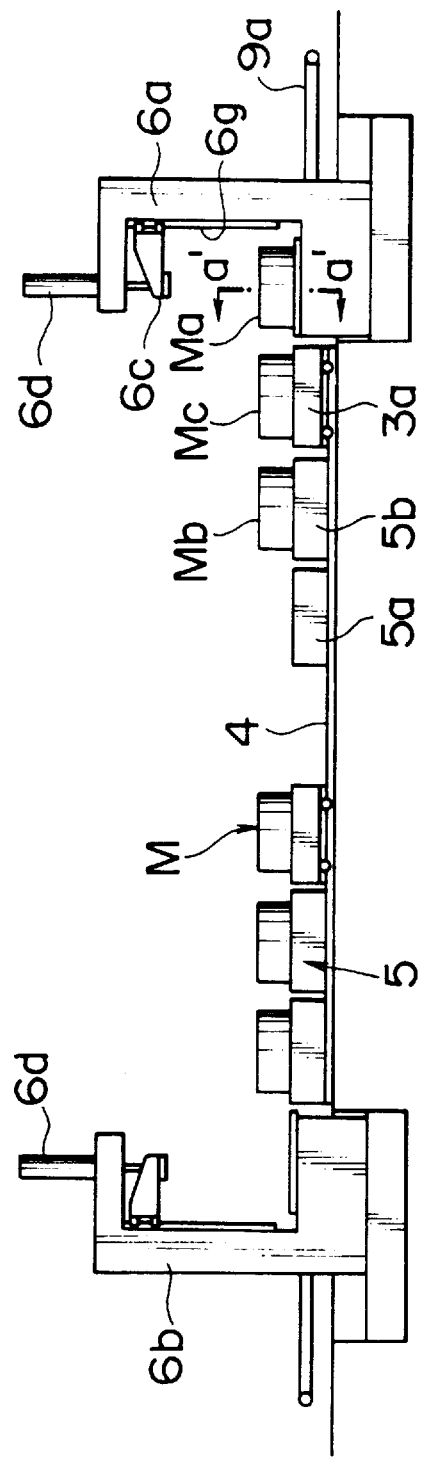
FIG. 11 is a longitudinal front view taken along the line a—a of FIG. 10.

The mold attaching/detaching device of this embodiment is shown by the enlarged sectional view taken along the line a'—a' of FIG. 11. The construction and operation thereof is the same as shown in FIG. 3.

The means for connecting the arm 6c' to the upper hot platen of the tire mold Ma has the same construction as that of the first embodiment shown in FIGS. 4 to 6.

Next, the operation of the tire vulcanizing system of the second embodiment will be described.

Figure 10:
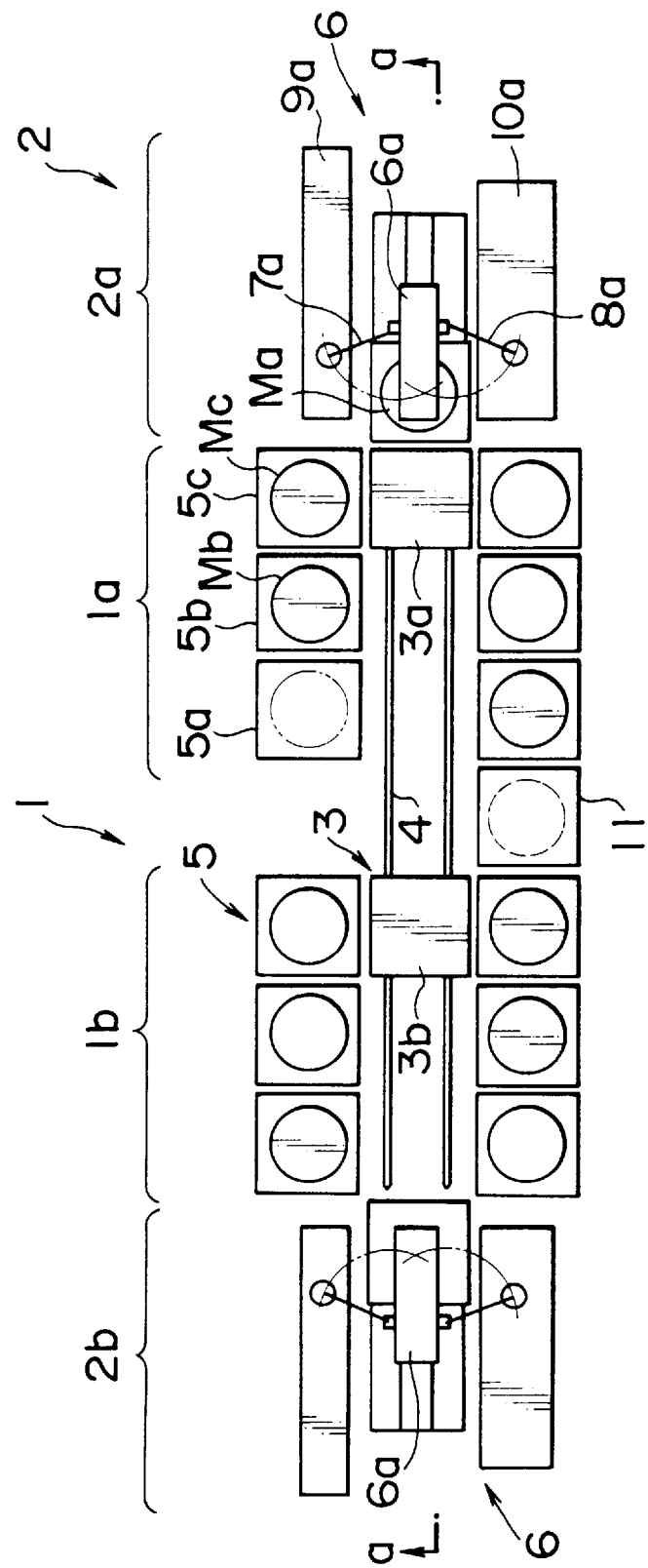
FIG. 10 is a plan view of a second embodiment of the tire vulcanizing system in accordance with the present invention.

FIG. 10 shows the condition in which vulcanization of tire in the tire mold Ma mounted on the mold base 5a of the vulcanizing station 1a has been completed, and the tire mold Ma has been transported into the mold opening/closing device 6a of the mold opening/closing station 2a by using the mold carriage 3a.

From this condition, the cylinder 6d is first operated to lower the arm 6c, and then the upper hot platen 114 of the tire mold Ma is connected to the arm 6c by using the attaching/detaching means 53 as shown in FIGS. 4 to 6. Then, as shown in FIG. 3, the pipe 57 is raised so as to communicate with the passage 101b. Then, the extension rod 59 is raised slightly so that the pipe 57 also communicates with the passage 123a. The cylinder 58 is rotated so that the claw 58a engages with the claw 123c.

Next, the switching valve (not shown) is operated to discharge the heating/pressurizing medium in the tire T. After a check is made to see that the pressure in the tire T is sufficiently decreased, the cylinder 56 is operated to push up the lower hot platen 103 so that the tread mold 109 is relatively moved from the tire T to release the mold. The diameter of the tread mold 109 is increased sufficiently, and the claws 110b and 110c of the segment 110 are disengaged from the claws 103a and 114a of the upper and lower hot platens. After that, the upper hot platen 114 is raised by the operation of the cylinder 6d in order to release the upper sidewall mold 113. The center post 123 is raised while a vacuum is created in the bladder B via the passage 123a in order to pull out the bladder B from the inside of the tire T.

Then, the vulcanized tire T is removed out of the tire mold Ma by the use of the unloader 7a, and the unvulcanized tire T to be vulcanized next is inserted into the tire mold Ma by the use of the loader 8a. While supplying steam for shaping into the bladder B via the passage 123a, the center post 123 is lowered, and the bladder B is inserted into the loaded unvulcanized tire T. After releasing the grip of a tire T, the loader 8a is moved to the waiting position.

When the loader 8a moves to a position such that the loader 8a does not interfere with the upper hot platen 114, the upper hot platen 114 is lowered by the operation of cylinder 6d to perform the shaping and tire mold closing processes by the publicly known procedure. After the upper hot platen 114 is allowed to abut on the segment 110, the cylinder 56 is also operated to push down the lower hot platen 103 by the upper hot platen 114 through the segment 110. This push-down action decreases the diameter of the tread mold 109, closing the tire mold Ma.

At this time, the claw 110c engages with the claw 114a, and the claw 103a engages with the claw 10b at the same time. Therefore, even when a heating/pressurizing medium is introduced to the inside of the tire T via the bladder B after the tire mold Ma is closed and vulcanization is started, the force to open the mold by the pressure of the heating/pressurizing medium is offset by the engagement of the claw 110c with the claw 114a and the engagement of the claw 103a with the claw 110b, so that the mold is not opened.

After the vulcanization of the tire is started, the connection between the tire mold Ma and the mold opening/closing device 6a is severed by reversing the above procedure. At this time, the passages 123a and 101b maintain the tire internal pressure because a check valve is installed at the lower part of each of the passages.

Next, the tire mold Ma is transported onto the mold base 5a of the vulcanizing station 1a by using the mold carriage 3a to carry on vulcanization. The mold carriage 3a receives the tire mold for the vulcanized tire and transports it to the mold opening/closing station 2a.

When the bladder B etc. is changed, the mold is closed once without loading the tire T to be vulcanized next (in this case, needless to say, a heating/pressurizing medium is not introduced). The mold is transferred to the mold changing station 11 to change the bladder B etc. During that time, loading and unloading of a tire to and from another tire mold M are performed at the mold carriage 3a and the mold opening/closing station 6a. After the change of the bladder B etc. is completed, the mold is transferred again to the mold opening/closing station to insert the tire to be vulcanized next.

Next, the tire vulcanizing system of a third embodiment of the present invention will be described with reference to FIGS. 12 and 13. The same character is applied to the same element, and only the portion different from the second embodiment will be described.

A vulcanizing station 12 includes, for example, 12a and 12b. It includes a plurality of mold bases 5 (5a, 5b, 5c, . . . ) on which a plurality of tire molds M (Ma, Mb, Mc, . . . ) are mounted, and a base 14 to which a plurality of mold bases are assembled. Each of the mold bases 5 is provided with mold moving means (for example, a cylinder-driven pusher) (not shown), and with heating/pressurizing medium replenishing means and pipes etc. as necessary. Although the arrangement of the mold opening/closing stations 6 (6a and 6b) with respect to the vulcanizing station 12 differs from that of the second embodiment, its configuration and operation are the same.

A mold carriage is configured by rails 4 fixed to the floor and publicly known carriages 13 (13a and 13b) which are guided by the rails 4 run by the operation of a driving means (not shown). This configuration is the same as that of the second embodiment, but the mold carriage of the third embodiment can carry two tire molds M. Further, unlike the second embodiment, the carrying surface can be raised and lowered. When being lowered, the carrying surface is at the same level as that of the lower mold base 5, and when being raised, it is at the same level as that of the upper mold base 5.

Figure 12:
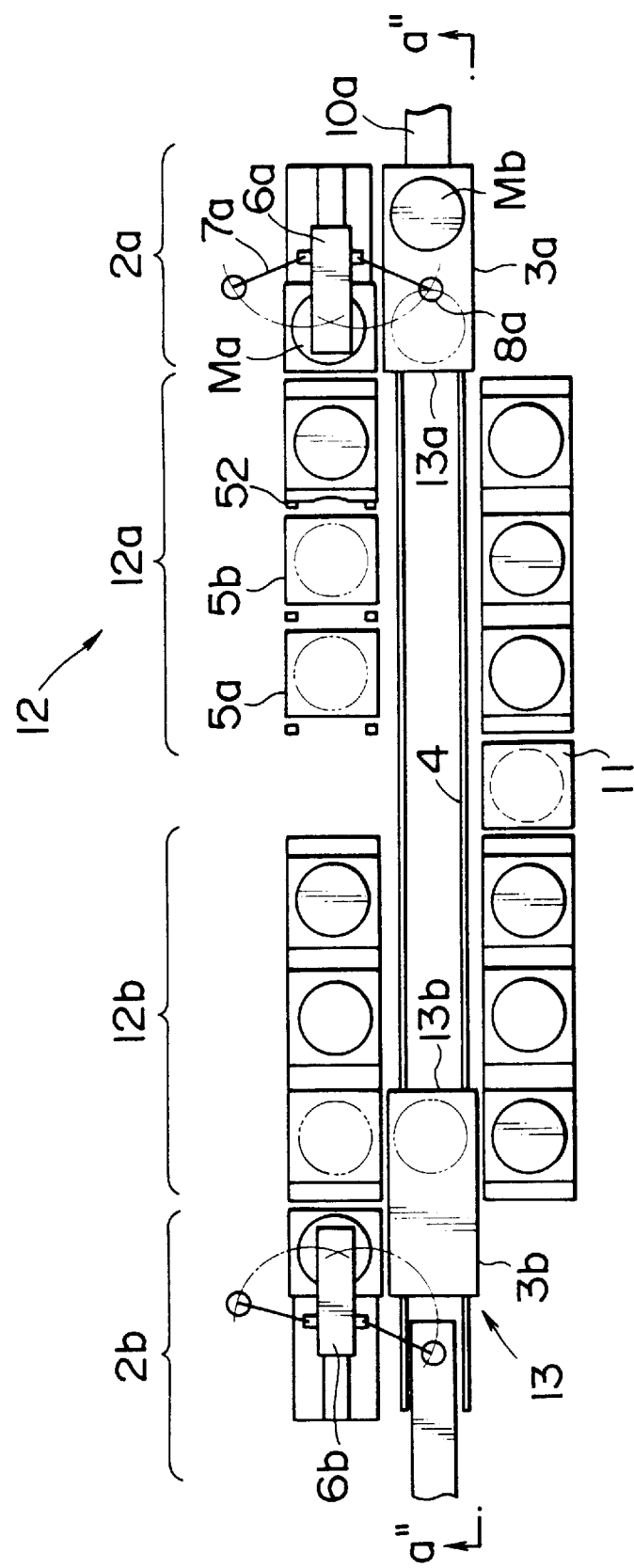
FIG. 12 is a plan view of a third embodiment of the tire vulcanizing system in accordance with the present invention.
Figure 13:
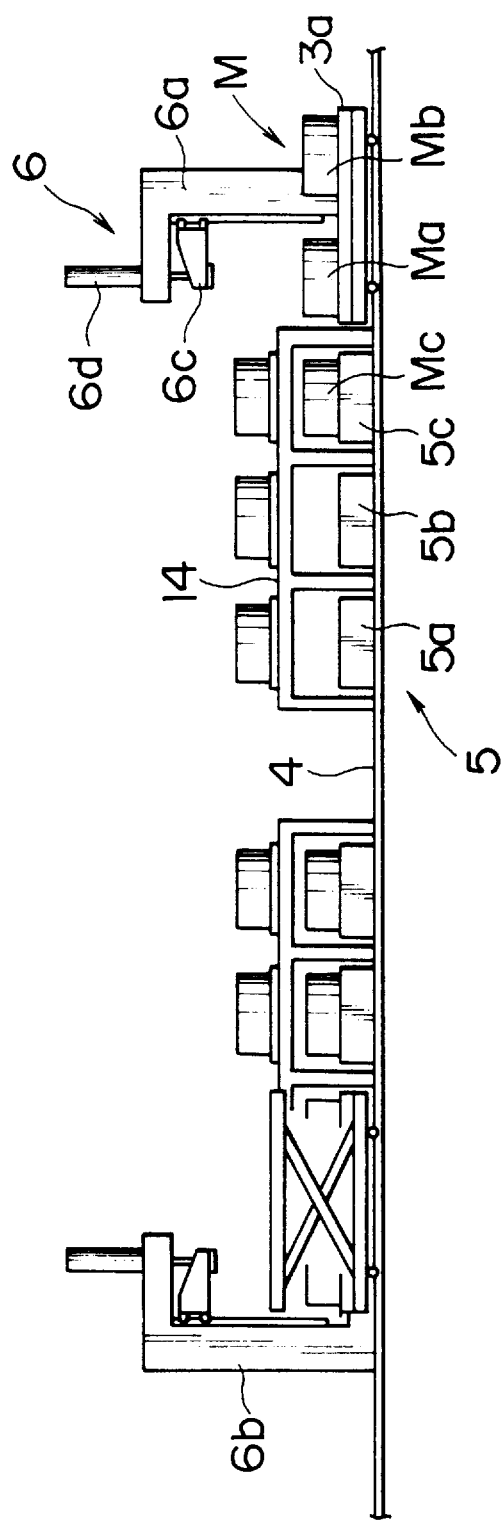
FIG. 13 is a longitudinal front view taken along the line a"—a" of FIG. 12.

FIG. 12 shows the condition in which the mold Ma in which vulcanization has been completed at the mold base 5a is transported to finish the loading/unloading of tire, the mold Mb in which vulcanization has been completed at the mold base 5b is put at the one loading position of the mold carriage 13a, and the empty loading position has been moved to the front of the mold opening/closing device 6a, with the mold carriage being stopped.

From this condition, the tire mold Ma in which the loading/unloading of a tire has been completed is first moved to the empty position of the mold carriage 13a by using driving means (not shown), and then the carriage 13a is moved and stopped so that the tire mold Mb lies in front of the mold opening/closing device 6a to supply the tire mold Mb to the mold opening/closing device 6a. The vulcanized tire T in the tire mold Mb is unloaded by the aforementioned procedure. Then, an unvulcanized tire T to be vulcanized next is loaded. During the shaping and mold closing processes, the tire mold Ma is transferred onto the mold base 5a by using the carriage 13a, and then the tire mold in which vulcanization has been completed (for example, Mc) is loaded at the predetermined position (the position where Mb has been loaded) and returned to the original position.

The tire vulcanizing system of the present invention, which is configured as described above, performs the following functions:

First, a tire mold of a type which offsets the force to open the tire mold by the pressure of the heating/pressurizing medium in the tire mold is used, and the tire mold is transported to the vulcanizing station during vulcanizing of a tire because the tire mold can be attached to and detached from the mold opening/closing device, by which the rate of operation of tire mold opening/closing and tire loading/unloading device, which had a very low rate of operation, can be significantly increased.

Second, the installation of the mold changing station in parallel with the mold carriage running space allows the change of a bladder etc. safely and without disturbing the vulcanization cycle time of other tire molds. Therefore, the rate of operation of the whole system can be improved.

Third, because the mold carriage can carry two tire molds, transportation of tire mold between the mold carriage and the vulcanizing station can be performed. Therefore, the rate of operation of the mold opening/closing device can be improved and the productivity of the whole system can be increased.

Fourth, because the vulcanizing station is designed so that the tire molds can be arranged at least two stages in the vertical direction during vulcanization, the number of tire molds being handled can be increased without increasing the system space for the system for tires which have a relatively long vulcanizing time compared with the tire loading/ unloading time, or the system space can be significantly reduced for the system for tires which have a relatively short vulcanizing time.

Next, the tire vulcanizing system of a fourth embodiment of the present invention will be described with reference to FIGS. 14 to 17. First, the entire configuration of the tire vulcanizing system will be described with reference to FIGS. 14 and 15. Reference character 1 denotes a base in which a lower central mechanism for operating the bladder and other elements are installed, M ($M_1$, $M_2$, . . . ) denotes a plurality of sets of tire molds installed onto the top surface of the base 1 with bolts etc., and 2 denotes rails arranged in parallel with the tire molds M. The rails 2 are fixed to the top surface of the base 1.

Reference numeral 3 denotes a mold opening/closing device which runs on the rails 2, 20 denotes a running frame for the mold opening/closing device, and 24 denotes a mold raising/lowering cylinder which is fixed to the running frame 20. The lower end of the piston rod of the mold raising/lowering cylinder 24 is fixed to an arm 21 installed to the running frame in such a manner as to rise and lower freely. The arm 21 incorporates an upper central mechanism 23 and is provided with a mold attaching/detaching device 22. Rails 20a are formed on the running frame 20.

An unloader 4 running on the rails 2 has an arm 4a and a tire gripping mechanism 4b installed at the tip end of the arm 4a. The arm 4a is installed to the running frame of the unloader 4 in such a manner as to rise and lower as well as oscillate. The unloader 4 is the same as the publicly known unloader except that it runs on the rails 2.

A loader 5 running on the rails 2 has an arm 5a and a tire gripping mechanism 5b installed at the tip end of the arm 5a. The arm 5a is installed to the running frame of the loader 5 in such a manner as to rise and lower as well as oscillate. The loader 5 is the same as the publicly known loader except that it runs on the rails 2.

Although the rails 2 are used for the mold opening/closing device 3, the unloader 4, and the loader 5, they may be configured into a special-purpose form.

Reference numeral 6 denotes an unvulcanized tire supply device, which will be described in detail later, and 7 denotes a base for vulcanized tire gripping/expanding/cooling device (PIC), which incorporates an air switching valve for inflating a tire, and other elements. A plurality of vulcanized tire gripping/expanding/cooling devices P ($P_1$, $P_2$, . . . ), which are installed to the base 7 in such a manner to be attached and detached freely, are similar to publicly known vulcanized tire gripping/expanding/cooling device except that they are installed to the base in such a manner as to be attached and detached freely.

Reference numeral 8 denotes rails fixed to the base 7, 9 denotes an unloader for the vulcanizing tire gripping/ expanding/cooling device, which runs on the rails 8, and 10 denotes a running frame of the unloader 9. At one side of the running frame 10, a lock housing elevator 10a, is installed in such a manner as to rise and lower freely. A lock housing attaching/detaching device 10b is installed at the tip end of the elevator 10a. A t the other side of the running frame 10, an arm 10c is installed in such a manner as to rise and lower as well as oscillate. A tire gripping mechanism 10d is installed at the tip end of the arm 10c. Reference numeral 11 denotes a belt conveyor for delivering vulcanized tires, and 12 denotes a storing device for a ring used for the vulcanized tire gripping/expanding/cooling device P ($P_1$, $P_2$, . . . ).

Figure 16:
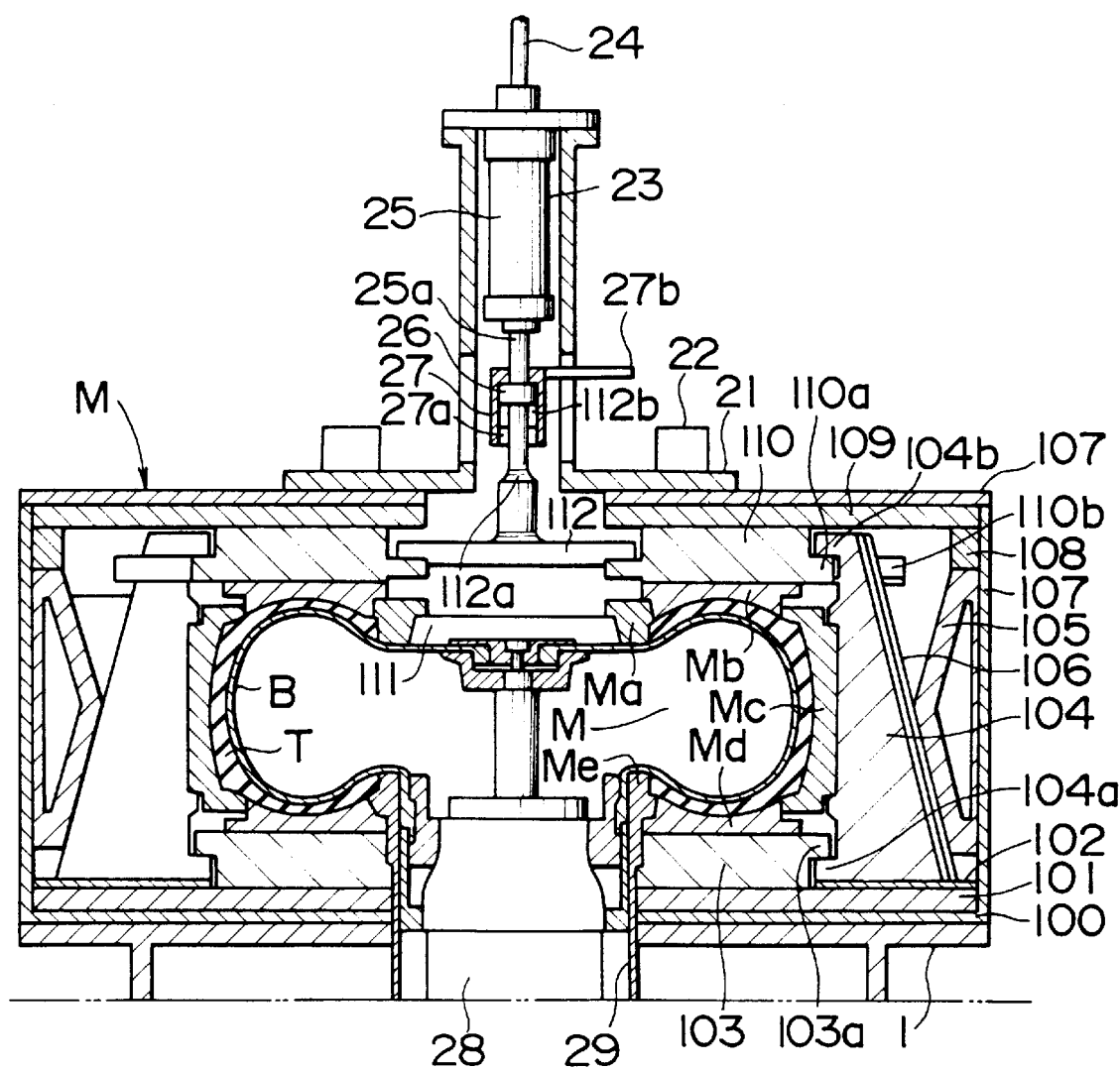
FIG. 16 is a transverse plan view taken along the line c—c of FIG. 15.

Next, the tire mold M will be described in detail with reference to FIG. 16. The mold attaching/detaching device 22 is the same as that shown in FIGS. 4 to 6.

A lower disk 101 is fixed to the base 1 via a heat insulating plate 100. To the upper surface of the lower disk 101 are fixed a lower hot platen 103 having a flange 103a at its periphery and a guide plate 102. A lower sidewall mold Md is bolted to the upper surface of the lower hot platen 103, and an outside cylinder 29 of the lower central mechanism 28, which operates a bladder B and supplies and discharges a heating/pressurizing medium etc. into and from the bladder B, is suspended at the inner peripheral portion. A lower bead ring Me is installed to the lower central mechanism 28 by using publicly known means.

Reference character Mc denotes a tread mold divided into plural numbers in the peripheral direction, and 104 denotes a segment of the same number, which is bolted to the outer surface of the tread mold Mc. The segment 104 is suspended and supported in such a manner as to slide in the radial direction by being guided by a guide 110b extending radially from a flange 110a integrally formed at the periphery of the upper hot platen 110. An upper sidewall mold Mb is bolted to the lower surface of the hot platen 110, and an upper bead ring Ma is bolted to the inside of the upper sidewall mold Mb. A pressure receiving plate 111 is bolted to the inside of the upper bead ring Ma.

Reference numeral 109 denotes an upper disk. To the lower surface at the periphery of the disk 109 is bolted an outer ring 105 having a steam chamber therein via a spacer 108. A T-shaped member 106, which is fixed to the inclined surface on the outside of the segment 104, engages slidably with a T-shaped groove extending up and down, which is formed on the inclined surface on the inside of the outer ring 105. As the upper disk 109 rises and lowers with respect to the upper hot platen 110, the tread mold Mc slides in the radial direction together with the segment 104. The lower surface of the segment 104 and the guide plate 102, which are in surface contact with each other, slide. When the segment 104 moves inward in the radial direction, molds Mb, Mc, and Md engage with each other, so that the inner surfaces of the molds Mb, Mc, and Md form the outer surface of the tire. Meanwhile, the claws 104a and 104b integrally installed at the lower and upper ends engage with the flanges 103a and 110a of the lower hot platen 103 and the upper hot platen 110, respectively. Reference numeral 107 denotes a heat insulating member.

The aforementioned tire mold M corresponds to a tire mold of a type which offsets the force to open the tire mold by the pressure of high-temperature, high-pressure heating/pressurizing medium introduced into the tire in the tire mold during the vulcanization of the tire.

In the upper central mechanism 23 incorporated in the arm 21 of the mold opening/closing device 3, the head end of a segment opening/closing cylinder 25 is fixed to the arm 21 via a flange, and a piston rod 25a of the segment opening/closing cylinder 25 is detachably connected to a flange 112 bolted to the inside of the upper hot platen 110 of the mold M via a connecting ring 27. Specifically, as shown in FIG. 16, a ring 26 is fixed to the tip end of the piston rod 25a inserted slidably into a hole above the connecting ring 27, and a plurality of claws 27a are integrally formed inside the connecting rod 27 at its lower end. Convex claws of the same number, which engage with the claws 27a or pass through the spaces between the claws 27a depending on the oscillating angle of the connecting ring 27, are formed integrally at the upper end of a shaft 112a extending upward from the center of the flange 112. A lever 27b is fixed to the connecting ring 27, and the other end of the lever 27b is connected to a cylinder for connection (not shown).

In the mold attaching/detaching device 22, as indicated by 53 in FIG. 4, the rotary cylinder 54 is bolted to the arm 51, the T rod 55 of the rotary cylinder 54 is inserted rotatably into the arm 51, claws 114b are installed on the inner surface of the hole in the upper disk 114, and the claw 55a, which engages with the claws 114b or passes through the space between the claws 114b depending on the rotational angle of the T rod, is installed at the lower end of the T rod 55.

Next, the unvulcanized tire supply device 6 will be described in detail with reference to FIG. 17. In this figure, reference numeral 30 denotes a frame fixed to the floor, 31 denotes rails fixed to the frame 30, and 32 denotes a roller conveyor which rises and lowers along the rails 31. The roller conveyor 32 moves up and down by means of a driving unit (not shown). A plurality of roller conveyors 33a, 33b, . . . 33e (unvulcanized tire storing racks) are installed on the frame 30. A roller conveyor 35, which rises and lowers along rails 34 fixed to the frame 30, moves up and down by means of a driving unit (not shown).

Next, the operation of the tire vulcanizing system will be described in detail.

Figure 14:
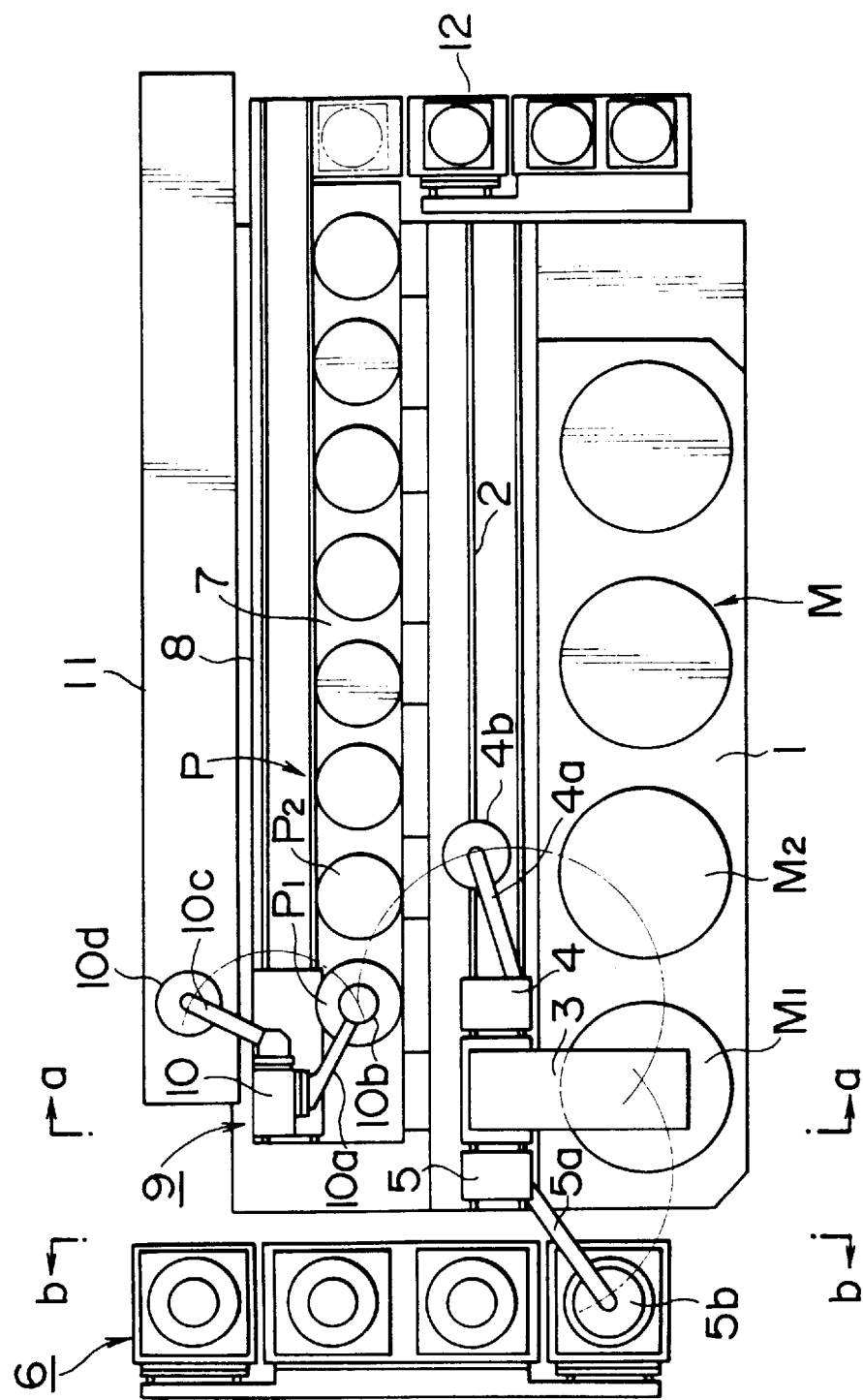
FIG. 14 is a plan view of a fourth embodiment of the tire vulcanizing system in accordance with the present invention.
Figure 15:
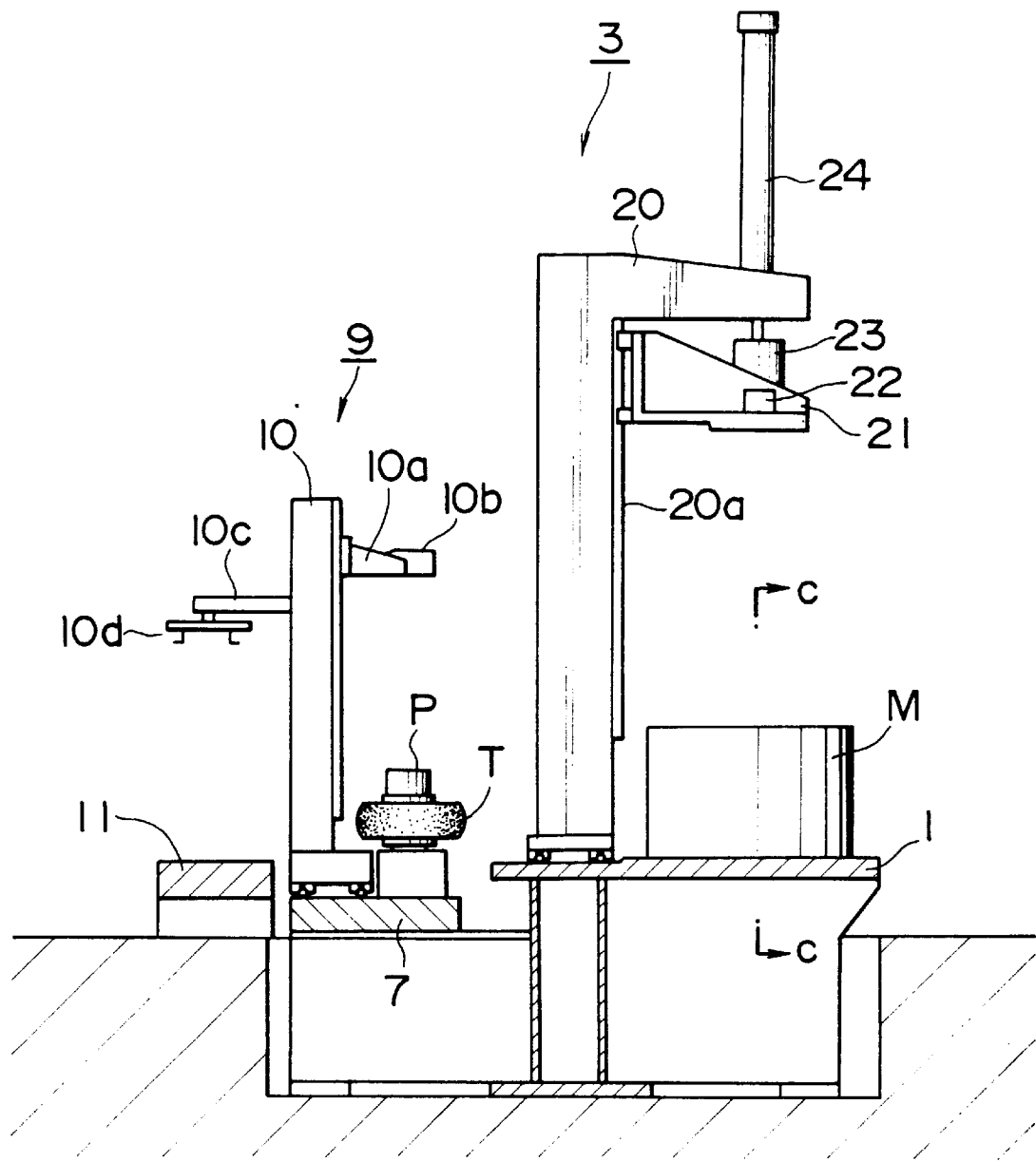
FIG. 15 is a front view taken along the line a—a of FIG. 14.

FIG. 14 shows the condition just before the vulcanization of the tire in the tire mold $M_1$ is completed. The mold opening/closing device 3, the unloader 4, and the loader 5 are gathered at the position of the tire mold $M_1$, and the loader 5 already grips the next unvulcanized tire.

When the vulcanization is completed and the heating/pressurizing medium in the tire begins to be discharged, the arm 21 of the mold opening/closing device 3 is lowered. When the arm 21 comes in contact with the tire mold $M_1$, the rotary cylinder 54 of the mold attaching/detaching device 22 and the cylinder for connection in the upper central mechanism 23 are operated to connect the arm 21 to the tire mold $M_1$. After the heating/pressurizing medium in the tire is discharged and the internal pressure of the bladder is sufficiently decreased, the mold raising/lowering cylinder 24 is operated while operating the piston rod 25a of the segment opening/closing cylinder 25 in the upper central mechanism 23 in the extension direction, to raise the arm 21. As a result, the upper disk 109 of the tire mold $M_1$ separates from the upper hot platen 110, and the diameter of the tread mold Mc is increased together with the diameter of the segment 104. The tire T is removed from the tire mold and the connection between the segment 104 and upper and lower hot platen 110 and 103 is severed. When the segment opening/closing cylinder 25 reaches the stroke end, the upper sidewall mold Mb separates from the tire T, and rises.

Then, the lower bead ring Mc is pushed up by the operation of the lower central mechanism 28 to remove the tire T from the lower sidewall Md. The bladder B is pulled into the lower central mechanism 28, and stored. Then, by oscillating and lowering the gripping mechanism 4b of the unloader 4, the vulcanized tire T is gripped, raised, and oscillated, so that the vulcanized tire T is unloaded from the tire mold.

After the vulcanized tire T is unloaded, the loader 5 is oscillated and lowered. The unvulcanized tire to be vulcanized next, which has been gripped by the loader 5, is mounted in the tire mold. After the unvulcanized tire is mounted in the tire mold, the unvulcanized tire is released from the gripping mechanism 5b. The loader 5 rises and oscillates, and fetches an unvulcanized tire from the unvulcanized tire supply device 6 by running if necessary.

The vulcanized tire T unloaded by the unloader is supplied to the vulcanized tire gripping/expanding/cooling device P by running the unloader 4 if necessary. In FIG. 14, it is supplied to $P_1$ or $P_2$.

Figure 17:
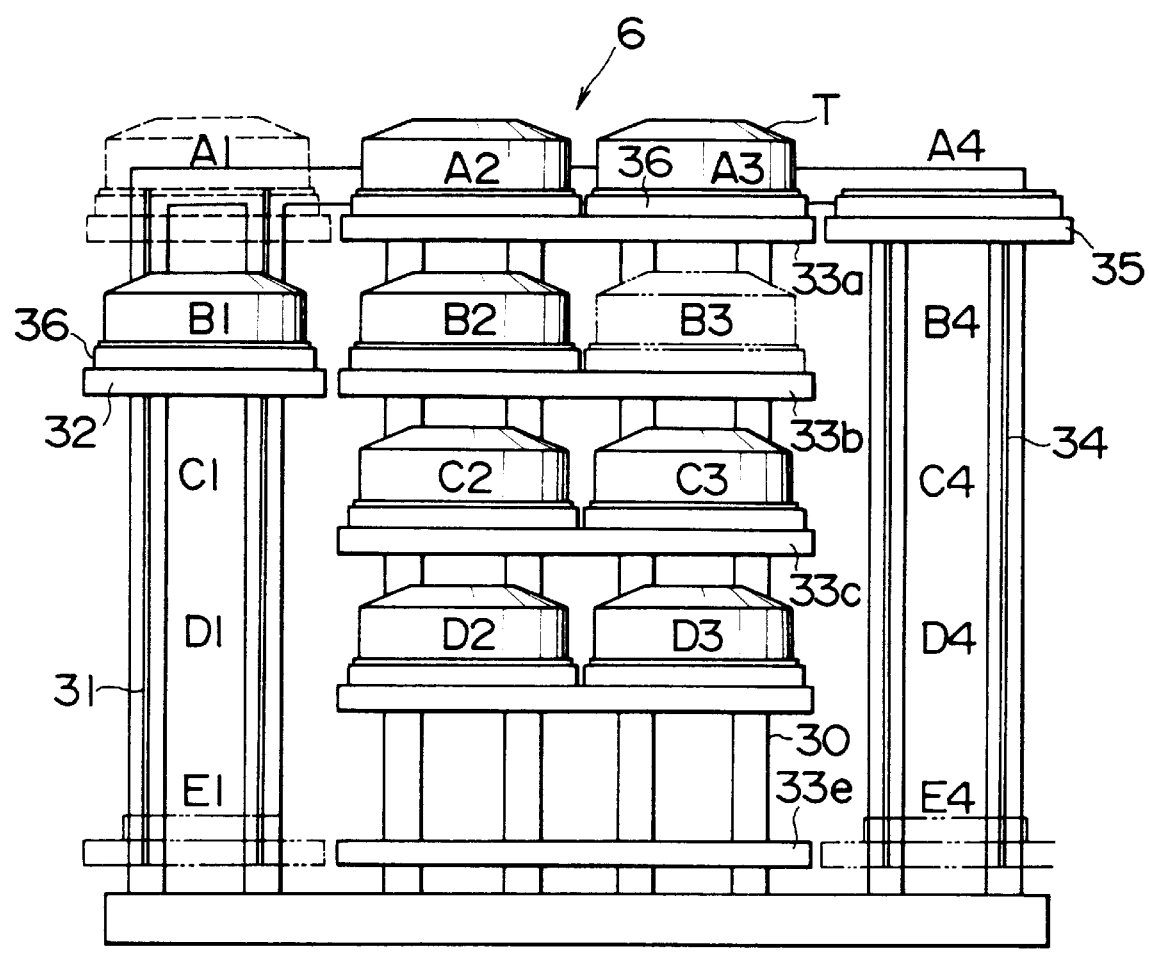
FIG. 17 is a front view of an unvulcanized tire supply device, taken along the line b—b of FIG. 15.

If in the unvulcanized tire supply device 6, for example, a tire at the $B_2$ position in FIG. 17 is selected as the tire to be supplied, the roller conveyor 32 is first raised. When the roller conveyor 32 reaches the $B_1$ position (the position indicated by the solid line in FIG. 17), the roller conveyor 32 and the roller conveyor 33b are driven at the same time to move the tire at the $B_2$ position to the $B_1$ position together with the pallet 36 and to move the tire at the $B_3$ position to the $B_2$ position. Then, the roller conveyor 32 is raised to the $A_1$ position (delivery position) and waits until the loader 5 comes to take the tire.

Then, the unvulcanized tire is hung up by the loader 5. The roller conveyor 32 with an empty pallet 36 is lowered to the $E_1$ position, and the empty roller conveyor 35 is also lowered to the $E_5$ position. By driving the roller conveyors 32, 33e, and 35 simultaneously, the pallet 36 on the roller conveyor 32 is transferred to the roller conveyor 35 through the roller conveyor 33e.

When the pallet 36 arrives, the roller conveyor 35 is raised to the $A_4$ position where the unvulcanized tire is received. After the unvulcanized tire is supplied, the roller conveyor 35 is transferred to the empty storing position (in this case, $B_3$ position in FIG. 17) together with the pallet 36.

If the tire to be used next is at the $B_3$ position, the tire at the $B_2$ position is transferred to the $B_3$ position via the belt conveyors 32, 32e, and 35. During this time, the tire at the B₃ position is transferred to the B₂ position, so that after this operation, the tire is transferred to the A₁ position (delivery position) by the above-described procedure.

As described above, the tire vulcanizing system of the present invention uses a tire mold of a type which offsets the force to open the tire mold by the pressure of a high-temperature, high-pressure heating/pressurizing medium introduced into the tire, in the tire mold during the vulcanization of a tire, and uses a set of the mold opening/closing device, unloader, and loader for plural sets of the tire molds to perform the loading of a unvulcanized tire, opening/closing of the tire mold, and unloading of a vulcanized tire, so that the rate of operation of the mold opening/closing device etc. can be improved significantly.

In the tire vulcanizing system of the present invention, since the mold opening/closing device, the loader, and the unloader are run independently, the running distance of these devices can be shortened. Also, the vulcanized tire can rapidly be transferred from the tire mold to the vulcanized tire gripping/expanding/cooling device, by which the tire quality can be improved significantly.

Further, a plurality of unvulcanized tires are stored in the unvulcanized tire supply device, and the necessary unvulcanized tire is selected from the stored unvulcanized tires and supplied. Therefore, in addition to a buffering effect, the system can flexibly accommodate the sequence change of unvulcanized tire processing due to the change of the bladder etc., which is an expendable item.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A tire vulcanizing system comprising:
   a vulcanizing station in which a plurality of sets of tire molds for vulcanization are arranged;
   a mold opening/closing station having a mold opening/closing device for opening/closing said tire mold, a loader for inserting an unvulcanized tire into said tire mold, and an unloader for removing a vulcanized tire from said tire mold; and
   transferring means for transferring a tire mold between said vulcanizing station and said mold opening/closing station.

2. The tire vulcanizing system according to claim 1, wherein said transferring means transfers a tire mold in said vulcanizing station to a mold opening/closing work position in said mold opening/closing station.

3. The tire vulcanizing system according to claim 1, wherein said system includes means for transferring said mold opening/closing station to a mold opening/closing work position in said vulcanizing station.

4. The tire vulcanizing system according to claim 1, wherein said system includes a mold carrier for transferring a tire mold between a tire mold delivery position and a tire mold opening/closing position in said mold opening/closing station; and a mold changing station for changing a tire mold and a bladder, wherein said tire mold is transferred between the vulcanizing station, the mold opening/closing station, and the mold changing station by using said transferring means.

5. The tire vulcanizing system according to claim 1, wherein each of said tire molds includes an upper sidewall mold, a lower sidewall mold, a tread mold, and means for vertically moving said lower sidewall mold and said tread mold, whereby vertical elevation of said lower sidewall mold causes said tread mold to move radially outwardly with respect to said lower sidewall mold.

6. A tire vulcanizing system comprising: a vulcanizing station for vulcanizing tires by arranging a plurality of sets of tire molds; a mold opening/closing station for removing a vulcanized tire by opening said tire mold and for closing said tire mold after an unvulcanized tire is inserted; a first mold carrier for transferring a tire mold between said vulcanizing station and said mold opening/closing station; and a second mold carrier for transferring a tire mold between a tire mold delivery position and a tire mold opening/closing position in said mold opening/closing station.

7. The tire vulcanizing system according to claim 6, wherein each of said tire molds includes an upper sidewall mold, a lower sidewall mold, a tread mold, and means for vertically moving said lower sidewall mold and said tread mold, whereby vertical elevation of said lower sidewall mold causes said tread mold to move radially outwardly with respect to said lower sidewall mold.

8. A tire vulcanizing system comprising:
   a vulcanizing station for vulcanizing tires by arranging a plurality of sets of tire molds;
   a mold opening/closing station for removing a vulcanized tire by opening said tire mold and for closing said tire mold after an unvulcanized tire is inserted and shaped; and
   a mold carriage for transporting a tire mold between said vulcanizing station and said mold opening/closing station,
   wherein each of said tire molds includes an upper sidewall mold, a lower sidewall mold, a tread mold, and means for vertically moving said lower sidewall mold and said tread mold, whereby vertical elevation of said lower sidewall mold causes said tread mold to move radially outwardly with respect to said lower sidewall mold.

9. The tire vulcanizing system according to claim 8, wherein said mold carriage is configured so as to carry two tire molds.

10. The tire vulcanizing system according to claim 9, wherein said vulcanizing station can arrange tire molds at least two stages in the vertical direction during vulcanization.

11. A tire vulcanizing system comprising: a vulcanizing station for vulcanizing tires by arranging a plurality of sets of tire molds; a mold opening/closing station for removing a vulcanized tire by opening said tire mold and for closing said tire mold after an unvulcanized tire is inserted and shaped; a mold changing station for changing a tire mold and a bladder; and a mold carriage for transporting a tire mold between each of these stations.

12. The tire vulcanizing system according to claim 11, wherein said mold carriage is configured so as to carry two tire molds.

13. The tire vulcanizing system according to claim 11, wherein said vulcanizing station can arrange tire molds at least two stages in the vertical direction during vulcanization.

14. The tire vulcanizing system according to claim 11, wherein each of said tire molds includes an upper sidewall mold, a lower sidewall mold, a tread mold, and means for vertically moving said lower sidewall mold and said tread mold, whereby vertical elevation of said lower sidewall mold causes said tread mold to move radially outwardly with respect to said lower sidewall mold.

15. The tire vulcanizing system according to claim 12, wherein said vulcanizing station can arrange tire molds at least two stages in the vertical direction during vulcanization.

16. A tire vulcanizing system comprising:
- a vulcanizing station for vulcanizing tires by arranging a plurality of sets of tire molds;
- a mold opening/closing station for removing a vulcanized tire by opening said tire mold and for closing said tire mold after an unvulcanized tire is inserted and shaped; and
- a mold carriage for transporting a tire mold between said vulcanizing station and said mold opening/closing station,
- wherein said vulcanizing station can arrange tire molds at least two stages in the vertical direction during vulcanization.

17. A tire vulcanizing system comprising:
- a plurality of sets of tire molds;
- a mold opening/closing device running on rails arranged in parallel with said tire molds;
- an unloader running on said rails for unloading a vulcanized tire from an opened tire mold;
- a loader running on said rails for loading an unvulcanized tire into said tire mold; and
- an unvulcanized tire supply device including:
    - storing racks for storing a plurality of sets of a pallet and an unvulcanized tire thereon; and
    - a conveying device for transferring the unvulcanized tire selected from said storing racks to a delivery position together with said pallet, for delivering the unvulcanized tire to said loader at said delivery position to transfer the empty pallet to an unvulcanized tire receiving position, and for transferring the pallet carrying an unvulcanized tire at said tire receiving position to an empty position on said storing racks.

* * * * *